Figure 5:
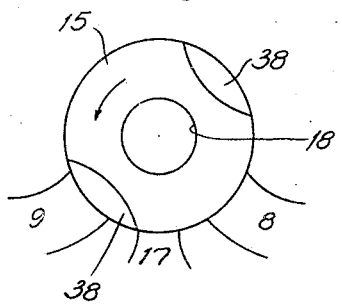
Figure 6:
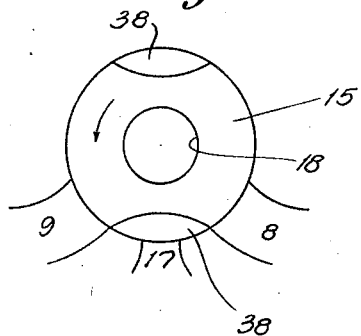
Figure 7:
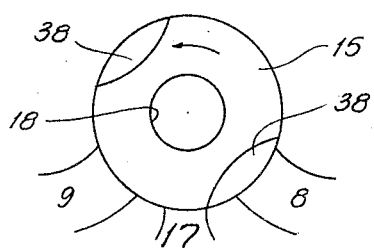
Figure 8:
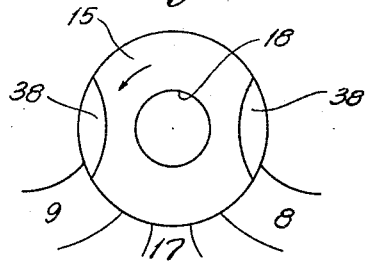
Figure 9:
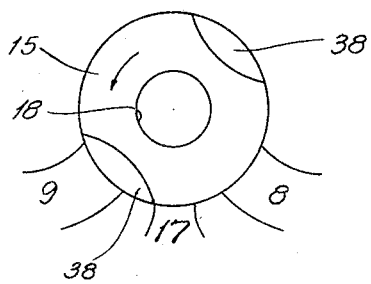

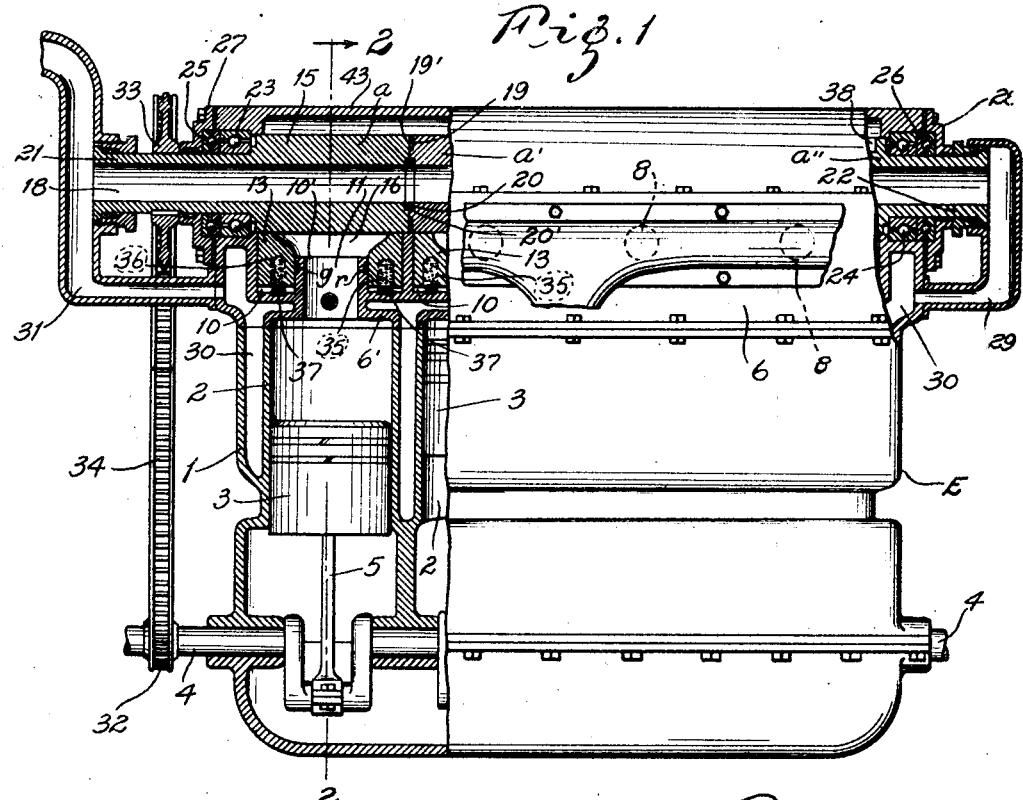

INVENTOR:
LOUIS JOHN DOERR.
BY Harry A. Bimmel
ATTORNEY.

Patented July 23, 1929.

1,721,899

UNITED STATES PATENT OFFICE.

LOUIS JOHN DOERR, OF ST. LOUIS, MISSOURI.

INTERNAL-COMBUSTION ENGINE.

Application filed March 16, 1927, Serial No. 175,867. Renewed January 25, 1929.

My invention has relation to improvements in internal combustion engines and is directed more particularly to that type of engine having an overhead rotary valve; and it consists in the novel features of construction more fully set forth in the specification and pointed out in the claims.

Briefly stated, the invention is directed to an engine provided with a rotary valve made up of sections to prevent the warping of the valve out of shape, said valve being mounted on ball bearings and having oppositely disposed depressions on its periphery to serve for admitting the combustible mixture to and the exhaust from the cylinders. The provision of a pair of such depressions oppositely disposed in preference to one depression insures a uniform heating of the valve and minimizes unequal expansion and warping thereof. However, to compensate for whatever warping may take place, the valve is also made in sections. The valve is freely rotatable within the valve chamber and is adapted to contact only with valve seats of limited extent inserted into each of the cylinders, said valve seats being shielded from the explosive effect of the gases within the cylinders by an annular flange extending inwardly over each valve seat.

The principal object of the invention is to effectively seal the combustion chamber against the loss of compression; to provide a freely rotatable valve for controlling the intake to and exhaust from the cylinders and to provide means for circulating a cooling medium through the valve. Further and other advantages will be better apparent from a detailed description of the invention in connection with the accompanying drawings, in which—

Fig. 1 is a side elevation of my improved engine with parts broken away so as to show the interior construction thereof; Fig. 2 is a vertical transverse section taken through the engine on the line 2—2 of Fig. 1; Fig. 3 represents a bottom face view of a valve seat shoe; Fig. 4 is a top plan view of a section of the cylinder block head, and Figs. 5 to 9 inclusive diagrammatic views showing the successive positions of the valve for a complete cycle of engine operations.

Referring to the drawings, E represents my improved engine composed of an engine block 1 having a plurality of cylinders 2, in which operate the pistons 3 connected to the crank shaft 4 by the usual connecting rods 5. A cylinder head 6 is securely bolted to the engine block 1, and is provided with intake ports 8 and exhaust ports 9 for each cylinder. Within the head 6 and disposed above each cylinder 2 is a rectangular socket 10 from the center of which projects a cylindrical boss 10', which is transversed by an opening 11. A valve seat shoe 13 having a cylindrical depression 13' is adapted to fit into the socket 10 and over the boss 10'. The said valve shoe has its inner face 12 concave to fit the periphery of a cylindrical valve 15 operating therein. An opening 16 extends through the valve shoe 13, said opening merging into a long narrow slot 17 in the concave surface of the valve seat 12. It will be observed that the lower edge of the shoe 13 is entirely covered by the inwardly extending portion 6' of head 6, thereby shielding the valve shoe from the explosive effect of the gases within the cylinder 2. The boss 10' projecting upwardly from socket 10 is provided with a peripheral groove $g$ in which is inserted a packing ring $r$ to prevent leakage of the compression around the valve shoe 13.

The valve 15 is formed of sections $a$, $a'$, $a''$, each of which is hollow so as to form a continuous passage 18 through the valve, said sections having interlocking formations 19 and 19' on adjacent faces, and a gasket 20 is inserted in a recess 20' between adjacent sections to prevent leakage of the cooling water that is circulated through the passage 18. Valve section $a$ is provided with a reduced extremity 21 and section $a''$ is provided with a reduced extremity 22, said extremities being fitted with ball bearings 23 and 24 and thrust bearings 25 and 26 respectively, and held in place by end plates 27 and 28 bolted to the ends of the cylinder head 6. The reduced extremity 22 of the valve 15 is connected by a conduit 29 to water jacket 30 and the reduced extremity 21 of said valve is also connected to said water jacket 30 by an L-shaped fitting 31, said fitting 31 also serving as the outlet for the cooling water. The valve 15 is adapted to be rotated from the crank shaft 4 by a sprocket 32 on the crank shaft, a sprocket 33 on the extremity 21 of the valve and a sprocket chain 34 traveling over said sprockets. The sprockets are of the proper size so that the valve 15 will rotate at one-fourth the speed at which the crank shaft 4 rotates.

Obviously, when the engine is operating, the pressure caused by an explosion within the cylinder will have a tendency to urge the valve seat shoe 13 outwardly against the valve 15 and the suction within the cylinder on the intake stroke will have a tendency to pull the valve seat away from the valve, and if some means were not employed to prevent it, there would be a continuous back and forth movement of said valve seat. I overcome this difficulty by inserting coiled springs 35, 35 near each corner of the valve seat shoe 13 and the cylinder head depression 13', said springs being seated in depressions 36 in the valve shoe 13 and depression 37 in the cylinder head. The function of the springs is to continuously urge the valve seat outwardly against the valve 15 irrespective of whether the action within the particular cylinder exerts suction or pressure on the valve seat.

The valve 15 is provided with a pair of depressions 38, 38 for each cylinder 2, said depressions being coextensive in length with the slot 17 in the valve seat and of the proper width to bring the intake 8 and exhaust 9 into communication with said slot 17 to enable the engine to properly perform its functions throughout the complete cycle of operations. These functions will be better understood by referring to Figs. 5 to 9 inclusive wherein the positions of the valve for a complete cycle of operations from the end of one power stroke to the end of the succeeding power stroke, are shown.

Referring to Figs. 5 to 9 inclusive, the operation of my improved engine may be described as follows:

Fig. 5 represents the position of the valve at the end of the power stroke of the piston and as the piston moves upwardly, the valve rotates so as to uncover the opening 17 and permit the burnt gases to exhaust through the valve depression 38 and exhaust port 9. By the time the exhaust stroke is completed, the valve 15 is in the position shown in Fig. 6 which is the beginning of the intake stroke throughout which the valve 15 moves from the position shown in Fig. 6 to that shown in Fig. 7. It will be noted that at the beginning of the compression stroke of the piston, both depressions 38 are out of register with the slot 17 and at the end of the compression stroke (shown in Fig. 8), the explosion occurs, the depression 38 remaining out of register with the slot 17 throughout the power stroke. At the end of the power stroke, the other depression 38 occupies the position (Fig. 9) that the first depression 38 occupied in Fig. 5. Thus for a cycle of the engine, the valve 15 rotates but a half revolution and both sides of the valve are exposed to the hot exhaust gases so that the valve will be uniformly heated thus reducing the tendency to warp. It will be noted that the only points of contact of the valve 15 with the valve chamber are on the concave faces of the valve seat 13, thus greatly reducing friction and the power necessary to operate the valve.

Intake and exhaust ports 8 and 9 are each provided with a renewable bushing 39 held in place by a ring 40 threaded into the port, and a packing ring 41 is fitted into a groove 42 in each bushing 39 to prevent leakage around the bushing.

The valve 15 is protected from dust and dirt by a cover plate 43 bolted to the cylinder head 6.

Having described my invention, I claim:

1. An internal combustion engine having a cylinder block provided with a plurality of cylinders, pistons operating therein, a cylinder head removably mounted on the cylinder block, a rotary valve mounted in the cylinder head, said cylinder head having a passageway leading from each cylinder to the valve, a valve seat removably mounted in each of said passageways, pressure means for forcing each of said valve seats against the valve, said valve seat having oppositely disposed intake and exhaust ports communicating with the valve chamber and a port communicating with the cylinder and valve, and said valve having for each cylinder a pair of oppositely disposed depressions, and means for rotating the valve to successively bring the valve seat port into register with the intake and the exhaust ports.

2. An internal combustion engine having a cylinder block provided with a plurality of cylinders, pistons operating therein, a cylinder head removably mounted on the cylinder block, a rotary valve mounted in bearings at the ends of the cylinder head and having its working surface in non-contacting relation with the head, said cylinder head having a passageway leading from each cylinder to the valve, a valve seat removably mounted in each of said passageways said valve seat having intake and exhaust ports, means for shielding said valve seats from the pressure within the cylinders, and said valve having formations adapted to bring the cylinders into communication with the intake and exhaust ports.

3. An internal combustion engine having a cylinder block provided with a plurality of cylinders, pistons operating therein, a cylinder head removably mounted on the cylinder block, a rotary valve mounted in said cylinder head, said cylinder head having a passageway leading from each cylinder to the valve, a valve seat removably arranged in each of said passageways, said valve seat being provided with a port in communication with the cylinder and with intake and exhaust ports for said cylinder, and said valve having formation adapted to bring the latter ports into communication with the cylinder.

4. An internal combustion engine provided with a cylinder and a piston operable therein, a rotary valve mounted above said cylinder and having its working surface unconfined, a valve-seat shoe arranged between the cylinder and valve and adapted for movement to and from the valve, an exhaust and an intake port in said shoe, and means for sealing said ports against leakage.

5. An internal combustion engine provided with a cylinder and a piston operable therein, a rotary valve mounted above said cylinder and having its working surface unconfined, a valve-seat shoe yieldingly arranged between the cylinder and valve, means for holding the valve-seat shoe in operative relation with the valve, said shoe having a port in communication with the cylinder and having intake and exhaust ports, each of said ports being adapted to communicate with the valve, and pressure means for sealing said ports against leakage.

6. An internal combustion engine provided with a cylinder and a piston operable therein, a valve mounted for rotation above the cylinder and having its working surface unconfined, a valve-seat shoe arranged between the cylinder and the valve, means for exerting pressure on said shoe to hold it in contact with the valve, and exhaust and intake ports in the shoe.

7. An internal combustion engine provided with a cylinder and a piston operable therein, a valve mounted for rotation above the cylinder and having its working surface unconfined, a valve-seat shoe arranged between the cylinder and the valve, said shoe having a port in communication with the valve and the cylinder, and means for exerting pressure on said shoe to hold it in contact with the valve.

In testimony whereof I hereunto affix my signature.

LOUIS JOHN DOERR.